United States Patent
Hambrecht

(10) Patent No.: US 12,455,211 B2
(45) Date of Patent: Oct. 28, 2025

(54) TESTING OF PLANETARY TRANSMISSIONS WITHOUT PLANETARY CARRIER BEARING

(71) Applicant: FLENDER GMBH, Bocholt (DE)

(72) Inventor: Ralf Hambrecht, Bocholt (DE)

(73) Assignee: FLENDER GMBH, Bocholt (DE)

( * ) Notice: Subject to any disclaimer, the term of this patent is extended or adjusted under 35 U.S.C. 154(b) by 253 days.

(21) Appl. No.: 18/277,413

(22) PCT Filed: Feb. 4, 2022

(86) PCT No.: PCT/EP2022/052671
§ 371 (c)(1),
(2) Date: Aug. 16, 2023

(87) PCT Pub. No.: WO2022/175109
PCT Pub. Date: Aug. 25, 2022

(65) Prior Publication Data
US 2024/0125672 A1    Apr. 18, 2024

(30) Foreign Application Priority Data
Feb. 16, 2021   (EP) ..................... 21157316

(51) Int. Cl.
*G01M 13/022*   (2019.01)
*G01M 13/026*   (2019.01)

(52) U.S. Cl.
CPC ........ *G01M 13/026* (2013.01); *G01M 13/022* (2013.01)

(58) Field of Classification Search
CPC .... G01M 13/026; G01M 13/022; Y02E 10/72
See application file for complete search history.

(56) References Cited

U.S. PATENT DOCUMENTS

2013/0172145 A1* 7/2013 Mourani ............... F03D 9/25
                                                                475/221
2015/0285224 A1* 10/2015 Hambrecht ........... F03D 17/00
                                                                29/898.07

FOREIGN PATENT DOCUMENTS

| CN | 110220699 A | 9/2019 |
| DE | 102010053808 A1 | 6/2012 |
| EP | 1099882 A2 | 5/2001 |
| RU | 2466315 C1 | 11/2012 |

OTHER PUBLICATIONS

International Search Report for International Application No. PCT/EP2022/052671 dated May 17, 2022 (3 pages).
(Continued)

*Primary Examiner* — David J Bolduc
(74) *Attorney, Agent, or Firm* — REISING ETHINGTON, P.C.

(57) ABSTRACT

A test bench for testing a planetary transmission is provided. In order to utilize the test bench for a planetary transmission without a planetary carrier bearing, the test bench has a central bearing unit. The central bearing unit is configured to rotatably mount a planetary carrier of a first stage of the planetary transmission, and the central bearing unit is configured, furthermore, to center an internal gear of the planetary transmission with respect to the planetary carrier.

14 Claims, 2 Drawing Sheets

(56) References Cited

OTHER PUBLICATIONS

English Translation of International Search Report for International Application No. PCT/EP2022/052671 dated May 17, 2022 (2 pages).
Indian Office Action for Indian Application No. 202337054477 dated Aug. 29, 2025 (6 pages).

* cited by examiner

TESTING OF PLANETARY TRANSMISSIONS WITHOUT PLANETARY CARRIER BEARING

INTRODUCTION

The disclosure relates to a test bench for testing a planetary transmission. Furthermore, the disclosure relates to a test setup with a test bench of this type and with a planetary transmission to be tested. Furthermore, the disclosure relates to a method for testing a planetary transmission by means of a test bench of this type or for operating a test setup of this type. In addition, the disclosure relates to a use of a test bench.

Modern planetary transmissions, in particular in the case of use in wind power plants, are developed in part as modules in integrated systems. In the case of systems of this type, the transmission in part no longer has any planetary carrier bearing in the slowly running stage. These planetary transmissions are also called planetary transmissions which are free from planetary carrier bearings. As a consequence, they cannot be tested as a stand-alone module on the test benches which have been known up to now, and can therefore be tested only in the system on special test benches with high investment costs. The same applies to future service cases of planetary transmissions without planetary carrier bearings. These will not be able to be tested in future without the system on test benches such as, for example, the standard wind power transmission test benches.

Up to now, tests have been carried out in a complex manner in the system, or the planetary transmissions have had dedicated planetary carrier bearings.

A transmission test is to be understood to mean, in particular, tests, in the case of which at least a rotational movement, a torque, a bending moment or a combination thereof are applied to the transmission, in particular the planetary transmission. These loads are also called test loads.

CN 110 220 699 A has disclosed a test bench for testing a planetary transmission, in the case of which test bench a ring gear and a planetary carrier of the planetary transmission are fixed in an immobile manner, and a shaft which is provided for introducing a test torque and is coupled to a sun shaft is guided with play through the planetary carrier, with the result that a load which acts on the planetary carrier which is fixed in terms of movement can be measured via strain gages which are fastened to planetary carriers.

SUMMARY

At least one embodiment of the disclosure is based on the object of specifying a testing option for a planetary transmission which is free from planetary carrier bearings.

The object is achieved, at least per some embodiments, by way of a test bench with the features of claim 1, a method with the features of claim 4, and a use with the features of claim 11. Preferred refinements are specified in the subclaims and the following description, which refinements can represent an aspect of the disclosure in each case individually or in combination. If one feature is shown in combination with another feature, this serves merely for simplified illustration of the disclosure and is in no way intended to mean that this feature cannot be a development of the disclosure even without the other feature.

The test bench has a central bearing unit, the central bearing unit being configured to rotatably mount a planetary carrier of a first stage of the planetary transmission, the central bearing unit being configured, furthermore, to center a ring gear of the planetary transmission with respect to the planetary carrier. Furthermore, the object is achieved, per at least some embodiments, by way of a test setup with a test bench of this type and with a planetary transmission to be tested, the central bearing unit rotatably mounting the planetary carrier of the first stage of the planetary transmission to be tested, the central bearing unit centering the ring gear of the planetary transmission to be tested with respect to the planetary carrier. Furthermore, the object is achieved, per at least some embodiments, by way of a method for testing a planetary transmission by means of a test bench of this type or for operating a test setup of this type, a test load being transmitted with the aid of a flange from the ring gear to the housing of the central bearing unit.

The at least one stage of the planetary transmission is formed, in particular, by way of a planetary transmission, with the result that the stage can be configured as a planetary gear stage.

The disclosure is based, inter alia, according to at least some embodiments on the finding that the testing and checking of a planetary transmission which is free from planetary carrier bearings is also possible by way of the use of the proposed central bearing unit. Here, the planetary transmission which is provided for the test can be configured as a planetary transmission which is free from planetary carrier bearings. As a result of the possibility of mounting the first stage, the test bench or the test setup is suitable, in particular, for the measurements and tests on a planetary transmission which is free from planetary carrier bearings. The central bearing unit is a transmission-external apparatus of the test bench. This central bearing unit mounts the planetary carrier of the first stage of the planetary transmission to be tested. Moreover, the central bearing unit centers the corresponding ring gear or the respective ring gears with respect to the planetary carrier or the respective planetary carriers during the testing of a plurality of planetary transmissions. The flange serves for the attachment of the ring gear, in order to transmit a test load from the ring gear to the stationary part of the central bearing unit such as, for example, the housing of the central bearing unit. The flange is therefore arranged between the central bearing unit and the planetary transmission. Here, the flange can be assigned to the transmission or the central bearing unit. Moreover, as an alternative, the flange can also be configured as a separate component which is assigned to neither the transmission nor the central bearing unit. The test loads are likewise supported via the flange. A test load can be formed, for example, by way of a torque, a weight load and/or a bending moment. Here, the return of torque out of the ring gear into the surrounding construction takes place in an advantageous way via the housing of the central bearing unit, and is introduced further from there into a closed frame to electric machines of the test bench or into the foundation, in particular into the foundation of the central bearing unit.

The central bearing unit has, in particular, at least one anti-friction bearing. The central bearing unit preferably, per at least some embodiments, has at least two anti-friction bearings which are spaced apart from one another in the axial direction. As a result, the central bearing unit can support high radial forces and/or axial forces.

The testing with complex complete system tests can be dispensed with. To this end, by way of the proposed test bench or test setup, test benches which already exist can be retrofitted in a simple way with a central bearing unit and can be used for testing the modern transmissions which do not have planetary carrier bearings. The space requirement between the bracing systems is half as great, and the weights to be handled are likewise reduced by more than half.

The central bearing unit is therefore part of the test bench and does not need to be changed with the planetary transmission to be tested.

The arrangement of the test bench, the test setup, and the method are suitable in a particular way for the planetary transmission of a wind power plant. These transmissions are produced in relatively large numbers, and the requirements for reliability are particularly high on account of the arrangement of the planetary transmission in the tower of a wind power plant. Moreover, there are also numerous requirements with regard to certification which require tests under defined boundary conditions. These boundary conditions can be set on the test bench or on the test setup, with the result that this test bench or this test setup is suitable and advantageous to a particular extent for measurements and tests on a planetary transmission for wind power applications.

In the case of one advantageous refinement of the disclosure, the test bench is configured as a back-to-back arrangement. It is possible by way of this arrangement to test two planetary transmissions at the same time. In the case of the back-to-back design, the test bench is of symmetrical and/or mirror-inverted configuration with regard to the central bearing unit. The central bearing unit is also of symmetrical configuration in this case. The ring gear is mounted in each case with respect to the planetary carrier on the two sides of the central bearing unit, the test bench having in each case one flange on the housing of the central bearing unit on the two sides, in order to attach the planetary carrier. As an alternative, the flange can also be arranged on the planetary transmission, in particular on the planetary carrier, and can connect the latter to the central bearing unit. Two electric machines are therefore also provided for the back-to-back arrangement, between which electric machines the two planetary transmissions and the central bearing unit are advantageously arranged symmetrically, according to at least some embodiments. It is to be noted here that the electric machines do not necessarily have to be connected to the foundation, but rather can also be coupled and tested in the form of the hybrid drive (transmission-generator combination). The drive torque is not returned via the foundation in this case, but rather via the housings.

In the case of this arrangement, the return of torque from the ring gear into the surrounding construction also may take place in an advantageous way via the housing of the central bearing unit, and is introduced from there further into a closed frame to electric machines of the test bench or into the foundation, in particular into the foundation of the central bearing unit. In the present back-to-back arrangement, the main supporting moment can be eliminated via the housing of the central bearing unit by way of the counter-supporting moment of the second unit under test. In this way, in addition to the weight loads, only the drive and brake torques of the electric machine are then supported via the foundation.

One aspect of the disclosure, per at least some embodiments, relates to the use of the test bench, which can be configured and developed as described above, for carrying out measurements and/or tests on a planetary transmission which does not have any planetary carrier bearings.

BRIEF DESCRIPTION OF THE FIGURES

In the following text, the disclosure will be described and explained in greater detail on the basis of the exemplary embodiments which are shown in the figures, in which.

DETAILED DESCRIPTION

Figure 1:
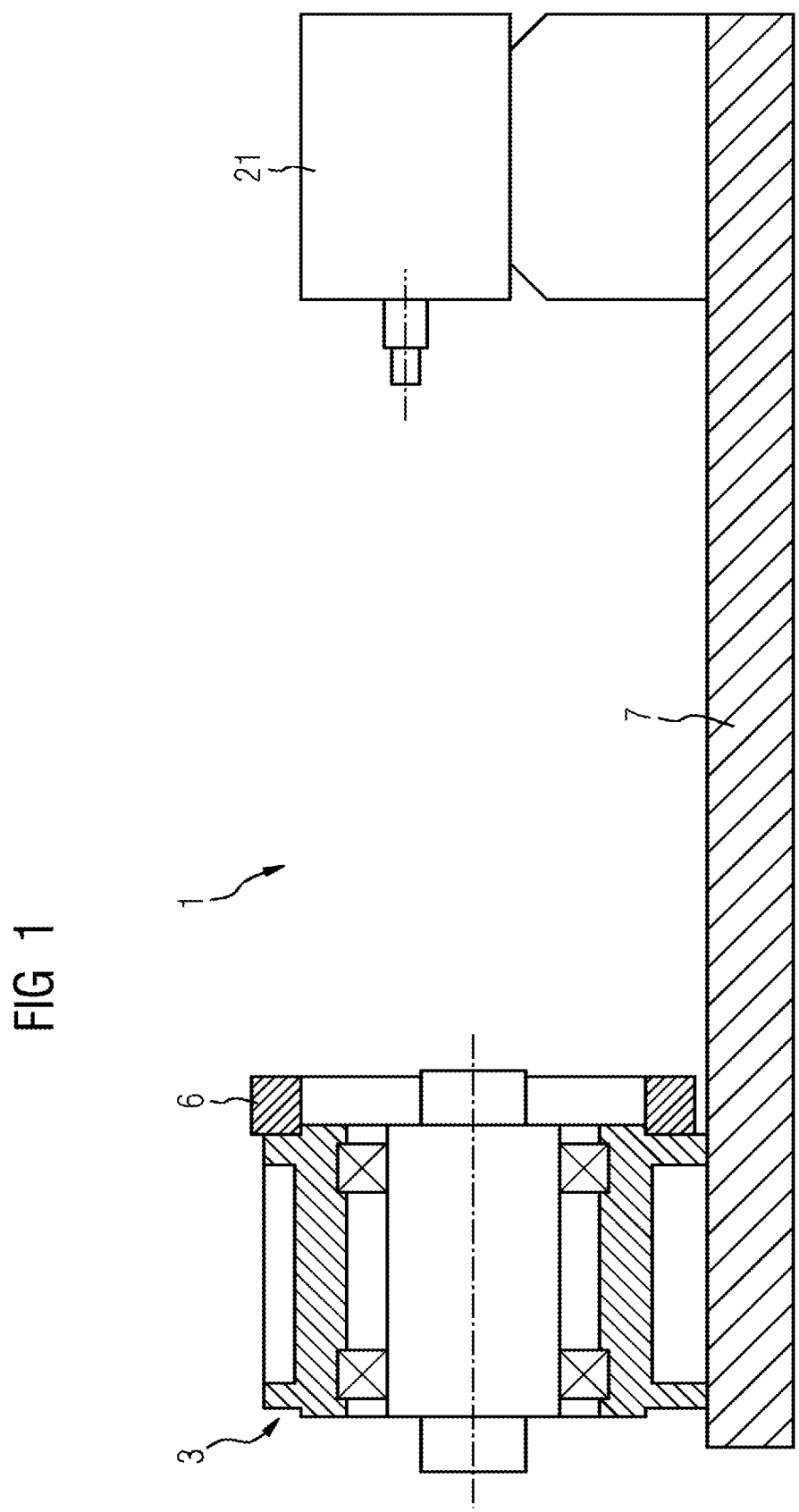
FIG. 1 shows a test bench.

FIG. 1 shows a test bench 1 for testing a planetary transmission 2 (not shown here) which does not have any planetary carrier bearings. A central bearing unit 3 is provided for the purpose of being connected to the planetary transmission 2 and holding and centering the latter. Since the holding makes rotation possible, it is also called rotatably holding, or mounting for short. A flange 6 on the central bearing unit 3 or on the planetary transmission 2 serves, inter alia, for further connection of the central bearing unit 3 to the planetary transmission 2. The flange 6 connects the ring gear 5 (not shown here) of the planetary transmission 2 to the central bearing unit 3. The return of torque from the ring gear 5 of the planetary transmission can take place as a result via the housing of the central bearing unit 3 into the foundation 7. In addition, the test bench 1 has an electric machine 21, by way of which the planetary transmission 2 can be loaded with a torque.

Figure 2:
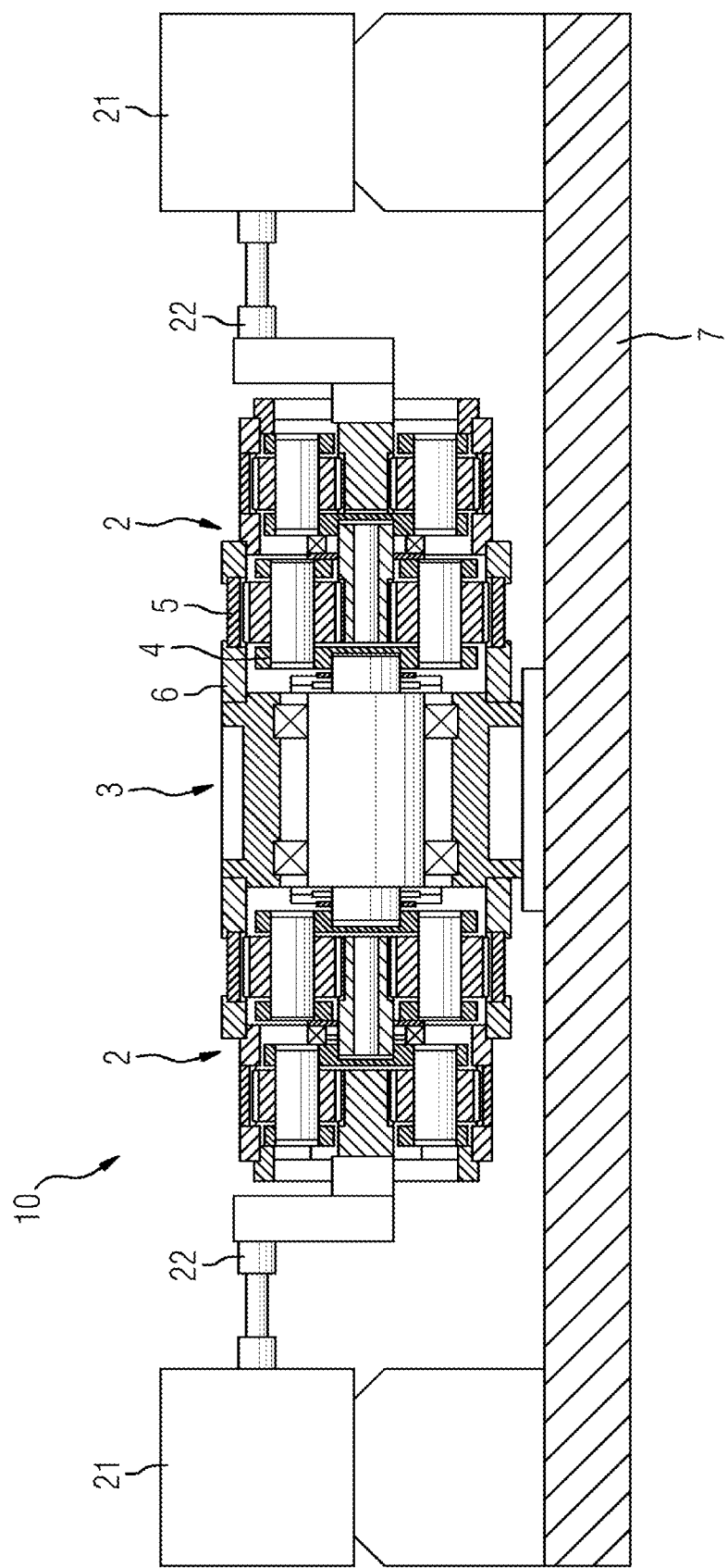
FIG. 2 shows a test setup.

FIG. 2 shows a test setup 10 on a test bench 1. In order to avoid repetitions, reference is made to the description with respect to FIG. 1 and to the designations introduced there. The planetary transmission 2 is connected via a test bench transmission 22 to the electric machine 21. The presence of the test bench transmission 22 is merely optional, however, and this transmission does not necessarily have to be part of the test setup 10. If the electric machine 21 covers the required torque and rotational speed range in terms of its configuration, a test bench transmission 22 can be dispensed with. This is the case, in particular, in medium speed electric machines. A concentric attachment of the electric machine 21 is then also possible. The other side of the planetary transmission 2 is connected to the central bearing unit 3, with the result that the planetary carrier 4 is mounted rotatably. The ring gear 5 of the planetary transmission 2 is connected by means of a flange 6 to the central bearing unit 3 and, via this, it can also ensure the return of torque as far as into the foundation 7.

The construction which is shown corresponds to a back-to-back arrangement, in the case of which two planetary transmissions 2 can be tested. Here, the test bench 10 is of symmetrical construction, with the result that a second electric machine 21 and a second test bench transmission 22 are also present. The central bearing unit 3 which mounts the planetary carriers 4 of the two planetary transmissions 2 is situated in the center. Therefore, the two planetary transmissions 2 are connected to one another via the central bearing unit 3.

In summary, the disclosure, per at least some embodiments, relates to a test bench for testing a planetary transmission. In order to use the test bench for a planetary transmission which does not have any planetary carrier bearings, it is proposed that the test bench has a central bearing unit, the central bearing unit being configured to rotatably mount a planetary carrier of a first stage of the planetary transmission, the central bearing unit being configured, furthermore, to center a ring gear of the planetary transmission with respect to the planetary carrier. Furthermore, the disclosure, per at least some embodiments, relates to a test setup with a test bench of this type and a planetary transmission to be tested, the central bearing unit rotatably mounting the planetary carrier of the first stage of the planetary transmission to be tested, the central bearing unit centering the ring gear of the planetary transmission to be tested with respect to the planetary carrier. Furthermore, the disclosure, per at least some embodiments, relates to a method for testing a planetary transmission by means of a test bench of this type or for operating a test setup of this type, a test load being transmitted with the aid of the flange from the ring gear to the housing of the central bearing unit.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A test bench for testing a planetary transmission, the test bench comprising a central bearing unit, the central bearing unit being configured to rotatably mount a planetary carrier of a first stage of the planetary transmission, the central bearing unit being configured, furthermore, to center a ring gear of the planetary transmission with respect to the planetary carrier.

2. The test bench as claimed in claim 1, wherein the central bearing unit has at least two anti-friction bearings which are spaced apart from one another in the axial direction for supporting radial forces, or axial forces, or both radial and axial forces.

3. The test bench as claimed in claim 1, wherein the test bench is configured as a back-to-back arrangement for simultaneously testing two planetary transmissions which are arranged in a mirror-inverted manner with regard to the central bearing unit with respect to one another.

4. A test setup with a test bench as claimed in claim 1 and with a planetary transmission to be tested, the central bearing unit rotatably mounting the planetary carrier of the first stage of the planetary transmission to be tested, the central bearing unit centering the ring gear of the planetary transmission to be tested with respect to the planetary carrier.

5. The test setup as claimed in claim 4, wherein the test setup is configured as a back-to-back arrangement.

6. The test setup as claimed in claim 4, wherein the planetary transmission to be tested is configured as a planetary transmission which is free from planetary carrier bearings.

7. The test setup as claimed in claim 4, wherein the planetary transmission to be tested has a first stage and at least one further stage which is coupled in a torque-transmitting manner to the first stage.

8. A method for testing a planetary transmission by way of a test bench as claimed in claim 1, wherein a test load is transmitted with the aid of a flange from the ring gear to the housing of the central bearing unit.

9. The method as claimed in claim 8, wherein a return of torque takes place from the ring gear via the housing of the central bearing unit into a foundation of the central bearing unit.

10. The method as claimed in claim 8, wherein the flange is arranged between the central bearing unit and the planetary transmission.

11. The use of the test bench as claimed in claim 1 to carry out measurements and/or tests on a planetary transmission which is free from planetary carrier bearings.

12. A method for operating a test setup as claimed in claim 4, wherein a test load is transmitted with the aid of a flange from the ring gear to the housing of the central bearing unit.

13. The method as claimed in claim 12, wherein a return of torque takes place from the ring gear via the housing of the central bearing unit into a foundation of the central bearing unit.

14. The method as claimed in claim 12, wherein the flange is arranged between the central bearing unit and the planetary transmission.

* * * * *